(12) United States Patent
Etcheverry et al.

(10) Patent No.: US 11,433,925 B2
(45) Date of Patent: Sep. 6, 2022

(54) METHOD AND DEVICE FOR ASSISTING THE AUTOMATED DRIVING OF A VEHICLE CLOSE TO A RESTRICTED AREA(S)

(71) Applicant: PSA AUTOMOBILES SA, Poissy (FR)

(72) Inventors: Celine Etcheverry, Verrieres le Buisson (FR); Jean-Francois Layerle, Thiais (FR); Audrey Rizzo, Suresnes (FR); Nolwenn Monot, Viroflay (FR)

(73) Assignee: PSA AUTOMOBILES SA, Poissy (FR)

( * ) Notice: Subject to any disclaimer, the term of this patent is extended or adjusted under 35 U.S.C. 154(b) by 124 days.

(21) Appl. No.: 16/976,686

(22) PCT Filed: Feb. 11, 2019

(86) PCT No.: PCT/FR2019/050287
§ 371 (c)(1),
(2) Date: Aug. 28, 2020

(87) PCT Pub. No.: WO2019/166714
PCT Pub. Date: Sep. 6, 2019

(65) Prior Publication Data
US 2021/0001893 A1  Jan. 7, 2021

(30) Foreign Application Priority Data
Mar. 1, 2018 (FR) ........................ 1851790

(51) Int. Cl.
*B60W 60/00* (2020.01)
*B60W 40/06* (2012.01)
(Continued)

(52) U.S. Cl.
CPC ........ *B60W 60/0053* (2020.02); *B60W 40/06* (2013.01); *G06V 20/582* (2022.01);
(Continued)

(58) Field of Classification Search
None
See application file for complete search history.

(56) References Cited

U.S. PATENT DOCUMENTS 3,996,228 A    12/1976  Arcari et al.
2014/0067187 A1  3/2014  Ferguson et al.
(Continued)

FOREIGN PATENT DOCUMENTS

| DE | 102014215473 A1 | 2/2016 |
| FR | 3007724 A1 | 1/2015 |
| WO | 2017178728 A1 | 10/2017 |

OTHER PUBLICATIONS

International Search Report for PCT/FR2019/050287 dated May 21, 2019.
Written Opinion for PCT/FR2019/050287 dated May 21, 2019.

*Primary Examiner* — David P. Merlino
(74) *Attorney, Agent, or Firm* — Sandberg Phoenix & von Gontard, P.C.

(57) ABSTRACT

A method for assisting the driver of a vehicle that comprises an analysis means which analyzes the environment in an area located in front of the vehicle in order to detect boundaries and traffic signs and to provide environmental data representative of said boundaries and traffic signs, and a control means which controls the automated driving of said vehicle. Said method comprises a step in which the environmental data are analyzed to determine a variation in speed limit correlated temporally with a variation in the number of traffic lanes, and when such a determination is made, it is considered that the vehicle is located close to a restricted area and an alert is generated requesting that the driver take back control of the driving while crossing said restricted area or that a specific automated driving strategy be implemented by the control means for said crossing.

11 Claims, 1 Drawing Sheet

(51) Int. Cl.
  *G06V 20/58*  (2022.01)
  *G06V 20/56*  (2022.01)
(52) U.S. Cl.
  CPC ....... *G06V 20/588* (2022.01); *B60W 2552/10* (2020.02); *B60W 2554/20* (2020.02); *B60W 2555/60* (2020.02)

(56) References Cited

U.S. PATENT DOCUMENTS

| | | | |
|---|---|---|---|
| 2015/0241878 A1* | 8/2015 | Crombez | B60W 50/08 |
| | | | 701/23 |
| 2017/0001650 A1 | 1/2017 | Park | |
| 2017/0228717 A1* | 8/2017 | Rovik | G06Q 20/085 |
| 2018/0154898 A1* | 6/2018 | Wrobel | B60W 10/04 |
| 2018/0174371 A1* | 6/2018 | Um | G01C 21/3658 |
| 2019/0152479 A1* | 5/2019 | Desmoineaux | B60W 40/04 |
| 2019/0184998 A1* | 6/2019 | Zheng | B60W 60/007 |
| 2019/0295417 A1* | 9/2019 | Hiramatsu | G08G 1/16 |
| 2020/0118432 A1* | 4/2020 | Heitzmann | G08G 1/096716 |
| 2020/0148221 A1* | 5/2020 | Degawa | B60W 60/0053 |
| 2020/0283027 A1* | 9/2020 | Okuyama | B60W 60/0053 |

\* cited by examiner

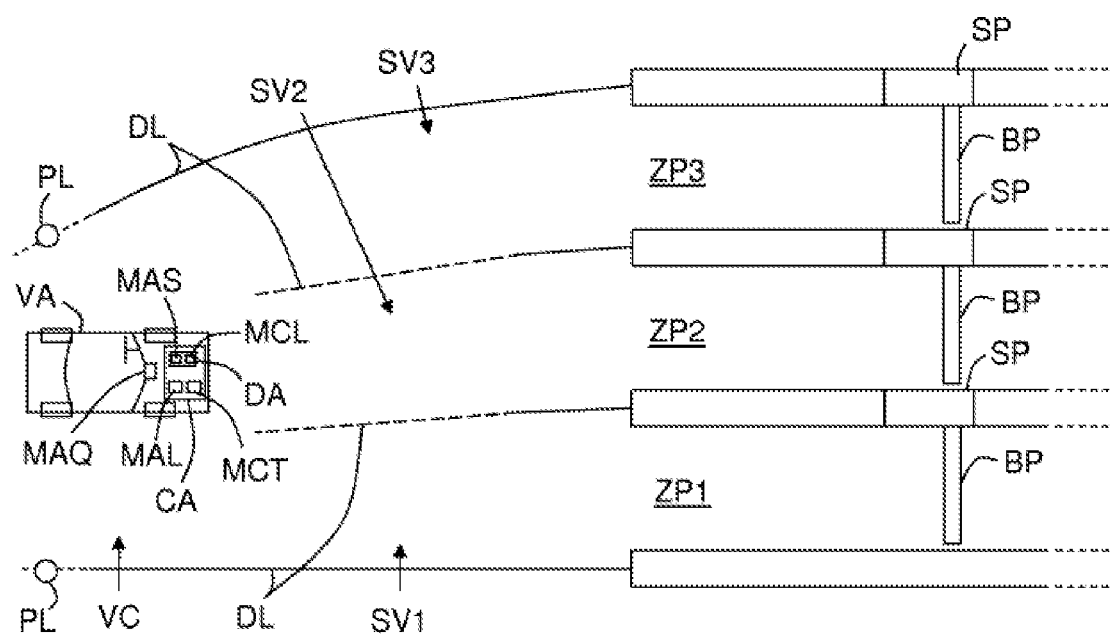

METHOD AND DEVICE FOR ASSISTING THE AUTOMATED DRIVING OF A VEHICLE CLOSE TO A RESTRICTED AREA(S)

CROSS-REFERENCE TO RELATED APPLICATIONS

This application is the US National Stage under 35 USC § 371 of International Application No. PCT/FR2019/050287, filed 11 Feb. 2019 which claims priority to French Application No. 1851790 filed 1 Mar. 2018, both of which are incorporated herein by reference.

BACKGROUND

The invention relates to automated (or autonomous) vehicles, optionally automotive-type vehicles, and more precisely to a means for assisting the driving of such vehicles.

In the following, "automated vehicle" is understood to mean a vehicle that can be driven in a (partially or completely (without driver intervention)) automated manner during an automated driving phase, or manually (and thus with driver intervention on the steering wheel and/or pedals) during a manual driving phase.

Some vehicles, generally automotive-type vehicles, comprise a driving assistance device (for example, of the ADAS ("Advanced Driver Assistance System") type) which is responsible for controlling the positioning of said vehicles relative to the transverse or longitudinal directions (and thus relative to the occupied traffic lane) for temporarily allowing the vehicles to be driven in an automated (or autonomous) manner. An assistance device of this kind is therefore capable of controlling, at least partially, the dynamics (direction, speed and acceleration) of the vehicle based on environmental data representative of surrounding vehicles, pedestrians, animals, objects, traffic signs and boundaries that are detected by on-board sensors or other analysis means.

However, this type of assistance device does not actually provide for automated driving control in some driving situations, and in particular when the vehicle is crossing a restricted area of a traffic lane, such as an expressway, a tunnel or bridge toll, or a parking lot toll. Therefore, when the vehicle arrives in a restricted area, its driver must take back control of the vehicle for safety reasons, since the vehicle's assistance device is not designed to control the crossing of said area. It should be noted that this obligation also exists when the restricted area is considered to be automated because it allows for the controlled automatic crossing of vehicles that are authorized to cross in a controlled manner.

This impossibility of controlling autonomous driving in a zone comprising restricted areas is due to the fact that signposts located at the edge of the traffic lane, for example in a "toll booth," "ticket," "cash," or "electronic toll collection" type lane, are difficult to identify and often missed, may vary a lot depending on the country, and, in some cases, can appear very late, thus not providing the driver with enough time to correctly and calmly take back control of his vehicle.

It has been proposed, specifically in patent document FR 3007724, to use map information to detect the arrival of a vehicle close to restricted areas and to facilitate the automated positioning of the vehicle relative to one of said areas. However, a current map that defines all of the restricted areas in a sufficiently precise and exhaustive manner is not known to exist. Moreover, restricted areas are often temporarily closed, which can lead to the selection of a restricted area that is also closed. Additionally, the function of positioning by means of electromagnetic wave based devices (optionally via satellites (for example GPS-type satellites)), which allows the current position of the vehicle to be supplied to the vehicle's assistance device, does not work, or at best works in an imprecise manner which is unsuitable for guiding at centimeter-level precision, in particular, when the vehicle is in a covered location (for example in a building parking lot or a tunnel or a toll station equipped with a roof or a canopy). Moreover, many vehicles do not have a navigational aid device and/or a positioning device using electromagnetic wave based technologies. Thus, a need exists to improve the deficiencies known in this regard.

SUMMARY

The aim of the invention is to improve the accuracy of positioning of automated (or autonomous) vehicles when entering a restricted area.

To that end, a method is proposed for assisting the driving of a vehicle that comprises a means for analyzing the environment in at least one area located in front of said vehicle in order to detect at least lane boundaries and traffic signs and to provide environmental data representative of detected traffic signs and boundaries, and a control means that controls the automated driving of said vehicle in a traffic lane defined by said environmental data.

Said assistance method comprising a step in which:
  the environmental data are analyzed in order to determine a variation in speed limit correlated temporally with a variation in a number of traffic lanes; and
  when such a determination is made, the vehicle is considered to be located close to a restricted area and an alert is generated requesting either that the driver take back control of the driving of said vehicle while crossing said restricted area or that said control means implement a specific automated driving strategy for crossing said restricted area.

Owing to this temporal correlation, it is now possible to detect the arrival of the vehicle close to a zone of a restricted area or of restricted areas early and definitively, and to alert the driver or the control means sufficiently in advance of the next crossing of a restricted area.

The assistance method may have other features which can be taken individually or in combination, and in particular:
  in the method step, a variation in speed limit correlated temporally with a variation in the number of traffic lanes can be determined when said variation in the number of traffic lanes occurs during a reduction of the speed limit or within a range of predefined distances after the last speed limit sign;
  in the method step, a variation in speed limit can be determined when a predefined sequence of traffic signs that define different speed limits and are spaced apart in pairs by predefined distances is determined;
  in the method step, when the analysis means also detects vehicles and safety barriers, the variation in the number of traffic lanes can be determined based on a variation in a number of detected boundaries and/or based on a variation in a distance between said vehicle and at least one detected vehicle and/or based on a variation in a distance between said vehicle and said detected safety barrier(s);
  in the method step, when the analysis means also detects vehicles traveling behind a safety barrier in a direction opposite to a travel direction of said vehicle, the variation in the number of traffic lanes can be determined based on a number of detected traffic lanes which are considered to be opposite traffic lanes due to the fact that vehicles in said lanes travel in said opposite direction;

in the method step, the environmental data is determined following instants of acquisition, which can be stored, and the stored environmental data are analyzed in a sliding window;

in the method step, it can be considered that the vehicle has exited the restricted area when a new variation in speed limit correlated temporally with a new variation in a number of traffic lanes is determined, and at least one other alert is generated which either suggests that the driver stops controlling the driving of the vehicle or requests that said control means implements an automated driving strategy adapted to different regions of the restricted areas.

A device for assisting a driver of a vehicle that comprises an analysis means which analyzes the environment in at least one area located in front of said vehicle in order to detect at least lane boundaries and traffic signs and to provide environmental data representative of said detected traffic signs and boundaries, and a control means which controls, based on said environmental data, the automated driving of said vehicle in a traffic lane defined by said boundaries.

Said assistance device comprises:

computing means that analyzes the environmental data in order to determine a variation in speed limit correlated temporally with a variation in a number of traffic lanes; and an assistance means that decides, when such a determination is made, that the vehicle is located close to at least one restricted area and generates at least one alert requesting either that the driver take back control of the driving of said vehicle while crossing said restricted area or that said control means implements a specific automated driving strategy for crossing said restricted area.

The invention also proposes a vehicle, optionally an automotive-type vehicle, comprising an analysis means that analyzes the environment in at least one area located in front of said vehicle in order to detect at least lane boundaries and traffic signs and to provide environmental data representative of detected traffic signs and boundaries, and a control means that controls, based on said environmental data, the automated driving of said vehicle in a traffic lane defined by boundaries, and an assistance device of the type mentioned above.

DESCRIPTION OF THE FIGURES

Other features and advantages of the invention will become apparent from reading the following detailed description, and from the appended drawing, in which the sole FIGURE schematically and functionally shows a traffic lane that is divided into three access lanes for restricted areas, in one of which an automated vehicle is preparing to travel, and in which the vehicle comprises a computer provided with an embodiment of an assistance device.

DETAILED DESCRIPTION

The aim of the invention in particular is to propose an assistance method and an associated assistance device DA for assisting the driving of an automated (or autonomous) vehicle VA in a traffic lane VC for accessing at least one restricted area ZPj.

It is reminded that "automated vehicle" is understood here to mean a vehicle that can be driven (partially or completely (without driver intervention)) in an automated manner during an automated driving phase, under the (partial or complete) control of an assistance device, or manually (and thus under the sole control of the vehicle's driver) during a manual driving phase.

In the following, it is considered, in a non-limiting manner, that the vehicle VA is an automotive-type vehicle. For example, the vehicle is a car. However, the invention is not limited to this type of vehicle. It relates to all types of automated (or autonomous) vehicles that can travel in land-based traffic lanes defined by boundaries.

The sole FIGURE schematically and functionally shows a traffic lane VC that is divided into three lanes SVj (j=1 to 3) for accessing relevant restricted areas ZPj. It should be noted that the number of access lanes SVj into which the traffic lane VC is divided can have any value greater than or equal to two (2). Moreover, it is possible to have at least two traffic lanes VC dividing into at least three access lanes SVj.

In this non-limiting example, a sole vehicle VA, which is automated and comprises a computer CA provided with an embodiment of an assistance device DA according to the invention, is traveling in the traffic lane VC and is preparing to take one of the access lanes SVj (in this case the second access lane SV2).

The traffic lane VC and the access lanes SVj are each defined by two boundaries DL.

It should be noted that, in the non-limiting example shown in the sole FIGURE, the traffic lane VC is part of a fast lane, and that the restricted areas ZPj each comprise a toll station SP associated with a barrier BP. However, the restricted areas ZPj may control access to other places, for example a tunnel, a bridge, or a parking lot.

The vehicle VA being an automated vehicle, comprises in particular a steering wheel, an acquisition means MAQ, an analysis means MAL and a control means MCT, in addition to its assistance device DA.

Although it cannot be seen in the sole FIGURE, the steering wheel is rigidly connected to a steering column in order to allow a driver to control said wheel by exerting a torque thereon using at least one of his hands during a manual or partially automated driving phase. Said steering column is coupled to a steering controller (not shown) that can be controlled using a set point, for example an assistance torque set point.

The analysis means MAL is arranged so as to analyze the environment in at least one area located in front of the vehicle VA in order to detect at least lane boundaries DL and traffic signs PL and to provide environmental data representative of said detected traffic signs PL and boundaries DL and of their respective relative positions in relation to the vehicle VA (at a position in question). It should be noted that said environmental data may be in addition and in particular representative of vehicles, pedestrians, animals, objects and safety barriers, and any properties which describe these. A property may be, for example, a kinematic parameter, dimensions, a shape, a type, or a likelihood of occurrence. A kinematic parameter can be, for example, a position relative to the vehicle VA, the direction (or the course), the speed relative to the vehicle VA, and the acceleration relative to the vehicle VA.

The environment analyzed by the analysis means MAL is defined by data acquired by the acquisition means MAQ provided on the vehicle VA. Said acquisition means MAQ comprises at least one digital camera that is oriented toward the front of the vehicle VA and is responsible for acquiring images of the area located in front of said vehicle (VA). It should be noted that the acquisition means MAQ can additionally comprise at least one other digital camera and/or at least one ultrasonic sensor and/or at least one scanning laser and/or at least one radar or lidar.

For example, the traffic signs PL and boundaries DL can be detected by means of shape recognition, and their positions can be defined relative to a reference system linked to the vehicle VA in the position in question. The boundaries DL may be, for example, modeled by mathematical polynomials using the analysis means MAL, using a point on the vehicle VA as a reference.

In the example shown in a non-limiting manner in the sole FIGURE, the analysis means MAL are part of a computer CA which also comprises the assistance device DA. However, this is not compulsory. The analysis means MAL may be part of a computer other than the computer CA, or may comprise its own computer. Moreover, said analysis means MAL may optionally be part of the assistance device DA. As a result, the analysis means may be designed as a set of software modules (or data processing modules, or "software") or as a combination of electrical or electronic circuits or components (or "hardware") and software modules.

The control modules MCT are arranged so as to control the driving of the vehicle VA in an automated manner in a traffic lane VC or SVj on the basis of environmental data determined by the analysis means MAL. Said control means is optionally what a person skilled in the art refers to as an ADAS device (Advanced Driver Assistance System).

Said control means MCT is therefore arranged so as to control, during at least a partially automated driving phase, the positioning of the vehicle VA relative to the transverse direction (and thus relative to the boundaries DL) and the longitudinal direction. As a result, said means controls, at least partially, the dynamics (direction, speed, and acceleration) of the vehicle VA based on environmental data supplied by the analysis means MAL. For this purpose, it generates in particular the steering controller set point.

In the example shown in a non-limiting manner in the sole FIGURE FIG. 1, the control means MCT is part of the computer CA which also comprises the assistance device DA. However, this is not compulsory. The control means MCT may be part of a computer other than the computer CA, or may comprise its own computer. Moreover, the assistance device DA may optionally be part of the control means MCT. As a result, the control means MCT can be designed as a set of software modules, or as a combination of electrical or electronic circuits or components and software modules.

As mentioned above, the invention proposes an assistance method for, in particular, assisting the driving of the vehicle VA when said vehicle (VA) is located close to a restricted area or restricted areas ZPj.

An assistance method comprises a step which can be implemented using an assistance device DA provided on the vehicle VA. As shown in the sole FIGURE, an assistance device DA comprises a computing means MCL and an assistance means MAS. The method step starts by analyzing the environmental data determined by the analysis means MAL in order to determine a variation in speed limit that is correlated temporally with a variation in a number of traffic lanes. This analysis is carried out by the computing means MCL of the assistance device DA.

Detecting a negative variation in speed limit is a first indication of arrival close to a restricted area or restricted areas ZPj. Detecting the division of at least one traffic lane VC into at least two access lanes SVj is a second indication of arrival close to a restricted area or restricted areas ZPj. Detecting these two indications substantially simultaneously is verification of arrival close to a restricted area or restricted areas ZPj.

For example, a variation in speed limit that is correlated temporally with a variation in the number of traffic lanes can be determined when said variation in the number of traffic lanes occurs in the middle of a reduction of the speed limit or in a range of predefined distances after the last speed limit sign PL. This distance range may, for example, extend over a length between 300 meters and 600 meters after the last speed limit sign PL before a restricted area ZPj. This length may thus be selected to be equal to 500 meters.

The method step continues when a temporal correlation has been determined. In this case, it is considered (or decided) that the vehicle VA is located close to at least one restricted area ZPj and at least one alert is generated requesting either that a driver of the vehicle VA take back control of the driving of said vehicle (VA) while crossing said restricted area ZPj or that said control means MCT implement a specific automated driving strategy for crossing said restricted area ZPj. Said consideration (or decision) and said alert generation are carried out by the assistance means MAS of the assistance device DA.

The temporal correlation makes it possible to definitively detect the arrival of the vehicle VA close to a zone containing at least one restricted area ZPj, and to alert the driver sufficiently in advance for him to calmly and correctly take back control of the vehicle VA or to alert the control means MCT such that they can implement an automated driving strategy that is perfectly adapted to crossing the restricted area ZPj.

The recipient of the alert depends on the type and or the configuration of the control means MCT provided on the vehicle VA. Therefore, when the control means MCT is not arranged so as to implement a specific automated driving strategy for crossing a restricted area ZPj, the driver is alerted. In contrast, when the control means MCT is arranged so as to implement a specific automated driving strategy for crossing a restricted area ZPj, the control means MCT is alerted (optionally with an information message additionally being sent to the driver). It is also conceivable that the control means MCT is arranged so as to implement a specific automated driving strategy for crossing a restricted area ZPj, but are temporarily unable to do so (possibly because the driver has not selected this configuration option). In this latter case, the driver is alerted.

It should be noted that, in the method step, a variation in speed limit can be determined when a predefined sequence of traffic signs PL which define different speed limits and are spaced apart in pairs by predefined distances is determined. The goal is to look for a series of speed reductions, for example of 20 km/h, starting from the speed limit applied to the traffic lane VC before the first reduction. This makes it possible to detect typical sequences that are representative of restricted areas ZPj, for example 130 km/h-110 km/h-90 km/h, or 130 km/h-110 km/h-90 km/h-70 km/h, or 110 km/h-90 km/h-70 km/h, or 120 km/h-100 km/h-80 km/h, or 120 km/h-100 km/h-80 km/h-60 km/h, or 100 km/h-80 km/h-60 km/h.

It should also be noted that, in the method step, when the analysis means MAL is also capable of detecting vehicles and safety barriers, the variation in the number of traffic lanes VC or SVj can be determined on the basis of a variation in the number of detected boundaries DL and/or on the basis of a variation in the distance between the vehicle VA and at least one detected vehicle and/or on the basis of a variation in the distance between the vehicle VA and a detected safety barrier. These variations are determined by the computing means MCL.

In this last option, when the analysis means MAL is also capable of detecting vehicles traveling behind a safety barrier in a direction opposite to the travel direction of the vehicle VA, the variation in the number of traffic lanes can be determined on the basis of the number of detected traffic lanes which are referred to as opposite traffic lanes due to the fact that the vehicles travel therein in the opposite direction. This variation is determined by the computing means MCL.

For example, when the analysis means MAL have detected N access lanes SVj, among which N1 are dedicated to the travel direction of the vehicle VA, and N2 are dedicated to the travel direction opposite to that of the vehicle VA, where N=N1+N2, the calculation means MCL only take the N1 access lanes SVj into consideration for determining the variation in the number of traffic lanes.

It should also be noted that, in the method step, the environmental data determined successively in accordance with instants of acquisition can be stored in storage means of the assistance device DA, and the stored environmental data can be analyzed in a sliding window. Said sliding window can be temporal or spatial. In this case, the "earliest" (in time or in space) stored environmental data are deleted in the course of their analysis so that the storage means are not overloaded with environmental data that has become useless. Said storage and said deletion may be controlled by calculation means MCL. Moreover, the storage means may optionally be part of the calculation means MCL and may be in any form known to a person skilled in the art. Instead of storing definitions of all the boundaries DL at the instant in question, it is possible to store the number of traffic lanes determined at the instant in question from said determined boundaries DL, and vice versa.

It should also be noted that, in the method step, it can be considered (or decided) that the vehicle VA has exited the restricted area ZPj if a new variation in speed limit correlated temporally with a new variation in the number of traffic lanes SVj and VC is determined. This exit from the restricted area ZPj corresponds to a situation that is substantially symmetrical to that shown in the sole FIGURE (namely, here, a reduction of the number of traffic lanes SVj together with an increase in the speed limit. In this case, at least one other alert is generated (or the assistance means MAS generates at least one other alert) which either suggests that the driver stops controlling the driving of the vehicle VA, or requests that the control means MCT implement an automated driving strategy that is adapted to different zones of the restricted areas (ZPj); the strategy is therefore not specific to said restricted areas (ZPj).

Detecting a positive variation in speed limit is a first indication of exiting from a restricted area ZPj. Detecting the merging of at least two access lanes SVj into at least one traffic lane VC is a second indication of exiting a restricted area ZPj. Detecting said two indications together substantially simultaneously is verification of exiting the restricted area ZPj.

Each driver alert can be carried out by means of a text message displayed on at least one screen of the vehicle VA, for example that of the instrument panel or that of the principal handset installed in or on the instrument board, and/or by means of an audio message transmitted by at least one speaker of the vehicle VA and/or by means of a haptic action, for example by making the steering wheel or the driver's seat vibrate.

It should also be noted that, in the example shown in a non-limiting manner in the sole FIGURE, the assistance device DA is located in the computer CA, which may optionally provide at least one other function. However, it (DA) may comprise a computer. As a result, an assistance device DA may be designed as software modules, or as a combination of electrical or electronic circuits or components and software modules.

The invention claimed is:

1. A method for assisting driving of a vehicle along a road having a number of traffic lanes and a speed limit, the vehicle comprising:
   analysis means adapted to analyze an environment in at least one area located in front of the vehicle in order to detect at least lane boundaries and traffic signs and to provide environmental data representative of said detected traffic signs and boundaries, and
   control means adapted to control automated driving of said vehicle in a traffic lane defined by boundaries as a function of said environmental data,
   said method comprising:
   i) said analysis means determining (a) if there is a variation in the speed limit, (b) if there is a variation in the number of traffic lanes, and (c) if there is a temporal correlation between the variation in the speed limit and the variation in the number of traffic lanes,
      wherein, the variation in the speed limit is determined to be correlated temporally with the variation in the number of traffic lanes when said variation in the number of traffic lanes occurs in a range of predefined distances after a last speed limit sign, and
   ii) when the analysis means determines there is a temporal correlation between the variation in the speed limit and the variation in the number of traffic lanes, said analysis means determines that said vehicle is located close to at least one restricted area and generates an alert requesting either that a driver of said vehicle take control of the driving of said vehicle while crossing said at least one restricted area or that said control means implement a specific automated driving strategy for crossing said at least one restricted area.

2. The method according to claim 1, wherein, said variation in the speed limit is determined to exist when a predefined sequence of traffic signs is detected in which the signs define different speed limits and are spaced apart in pairs by predefined distances.

3. The method according to claim 1, wherein, the analysis means is adapted to detect a presence of vehicles and safety barriers in said environment, said variation in the number of traffic lanes is determined based on a variation in a number of safety barriers detected and/or based on a variation in a distance between said vehicle and at least one detected vehicle and/or based on a variation in a distance between said vehicle and a detected safety barrier.

4. The method according to claim 3, wherein, when the analysis means also detects a second vehicle traveling behind a safety barrier in a direction opposite to a travel direction of said vehicle, the variation in the number of traffic lanes is determined as a function of the number of traffic lanes detected which are referred to as opposite traffic lanes due to the fact that vehicles travel in said lanes in said opposite direction.

5. The method according to claim 1, wherein, said environmental data is determined successively to provide multiple successive data elements which are stored, and the stored data elements are analyzed in a sliding window.

6. The method according to claim 1, wherein, said method comprises:
a step of determining when said vehicle has exited said restricted area, said step of determining comprising detecting a new variation in the speed limit and a new variation in the number of traffic lanes and temporally correlating said new variation in the speed limit and said new variation in the number of traffic lanes, and
a step of generating at least one other alert which either suggests that the driver stops controlling the driving of said vehicle or requests that said control means implement an automated driving strategy adapted to different areas of the restricted areas.

7. An assistance device for assisting driving of a vehicle that comprises:
an analysis means which analyzes an environment in at least one area located in front of said vehicle in order to detect at least lane boundaries and traffic signs and to provide environmental data representative of said detected traffic signs and boundaries,
a control means which controls, on the basis of said environmental data, automated driving of said vehicle in a traffic lane defined by said boundaries,
a computing means which analyzes said environmental data in order to determine a variation in speed limit correlated temporally with a variation in a number of traffic lanes, said computing means being adapted to determine the variation in the speed limit is correlated temporally with the variation in the number of traffic lanes by determining that said variation in the number of traffic lanes occurs in the range of predefined distances after a last speed limit sign; and
an assistance means which decides that when such a determination is made, the vehicle is located close to at least one restricted area and generates at least one alert requesting either that a driver of said vehicle take back control of the driving of said vehicle while crossing said at least one restricted area or that said control means implement a specific automated driving strategy for crossing said at least one restricted area.

8. The vehicle comprising the assistance device according to claim 7.

9. The vehicle according to claim 8, wherein said vehicle is an automotive-type vehicle.

10. A method for assisting driving of a vehicle along a road having a number of traffic lanes and a speed limit, the vehicle comprising:
analysis means adapted to analyze an environment in at least one area located in front of the vehicle in order to detect at least lane boundaries and traffic signs and to provide environmental data representative of said detected traffic signs and boundaries, and
control means adapted to control automated driving of said vehicle in a traffic lane defined by boundaries as a function of said environmental data,
said method consisting of the following steps:
i) said analysis means determining (a) if there is a variation in the speed limit, (b) if there is a variation in the number of traffic lanes, and (c) if there is a temporal correlation between the variation in the speed limit and the variation in the number of traffic lanes,
wherein, the variation in the speed limit is determined to be correlated temporally with the variation in the number of traffic lanes when said variation in the number of traffic lanes occurs in a middle of a reduction of the speed limit or in a range of predefined distances after a last speed limit sign, and
ii) when the analysis means determines there is a temporal correlation between the variation in the speed limit and the variation in the number of traffic lanes, said analysis means determines that said vehicle is located close to at least one restricted area and generates an alert requesting either that a driver of said vehicle take back control of the driving of said vehicle while crossing said at least one restricted area or that said control means implement a specific automated driving strategy for crossing said at least one restricted area.

11. The method according to claim 10, wherein the variation in the speed limit is determined to be correlated temporally with the variation in the number of traffic lanes when said variation in the number of traffic lanes occurs in the middle of the reduction of the speed limit.

* * * * *